United States Patent
Kennedy et al.

[11] Patent Number: 5,555,451
[45] Date of Patent: Sep. 10, 1996

[54] HIGH-QUALITY RECEPTION INDICATING CIRCUIT FOR SCANNING AM RECIEVERS

[75] Inventors: John F. Kennedy; Robert D. Plowdrey, both of Dearborn, Mich.; Yao H. Kuo, Shenfield, England

[73] Assignee: Ford Motor Company, Dearborn, Mich.

[21] Appl. No.: 258,875

[22] Filed: Jun. 13, 1994

[51] Int. Cl.$^6$ .................................................. H04B 1/26
[52] U.S. Cl. ........................... 455/161.2; 455/200.1; 455/229; 455/234.1
[58] Field of Search .................. 455/161.1, 61.2, 455/161.3, 200.1, 218, 219, 220, 221, 222, 224, 227, 229, 245, 312, 226.1–4, 150.1, 160.1, 295, 296, 303, 305, 234.1

[56] References Cited

U.S. PATENT DOCUMENTS

| | | | |
|---|---|---|---|
| 4,216,430 | 8/1980 | Amazawa | 455/219 |
| 4,262,363 | 4/1981 | Wiechmann | 455/161 |
| 4,313,217 | 1/1982 | Beuscher | 455/226.2 |
| 4,580,285 | 4/1986 | Richards, Jr. | 455/161 |
| 4,633,515 | 12/1986 | Uber et al. | 455/166 |
| 4,637,066 | 1/1987 | Kennedy et al. | 455/303 |
| 4,682,045 | 7/1987 | Amazawa | 455/222 |
| 5,073,975 | 12/1991 | Zarabadi | 455/161 |
| 5,073,976 | 12/1991 | Kennedy | 455/161 |
| 5,125,105 | 6/1992 | Kennedy | 455/164.1 |
| 5,199,109 | 3/1993 | Baker | 455/161.3 |

FOREIGN PATENT DOCUMENTS

| | | | |
|---|---|---|---|
| 404127619 | 4/1992 | Japan | 455/234.1 |
| 2187907 | 9/1987 | United Kingdom | 455/305 |
| 2227907 | 8/1990 | United Kingdom . | |

OTHER PUBLICATIONS

S. Arisawa, M. Nakagawa & I. Sasase; 1983; P 25.4.1–25.4.5; "Improvement of Signal–to–Noise Ratio by Nonlinear Cancellation in the Presence of Large. . .".

*Primary Examiner*—Reinhard J. Eisenzopf
*Assistant Examiner*—Thanh Le
*Attorney, Agent, or Firm*—Mark Mollon

[57] ABSTRACT

The reception quality of an AM broadcast signal is determined within a very short time of tuning to the channel frequency by modifying the intermediate frequency signal to remove the audio information modulated on the carrier but including residual noise and higher frequencies. The modified IF signal is used to regenerate a pure sine-wave carrier as a replica of the original carrier wave at the transmitter. This pure carrier is compared to the modified IF signal to identify degradation during transmission.

12 Claims, 2 Drawing Sheets

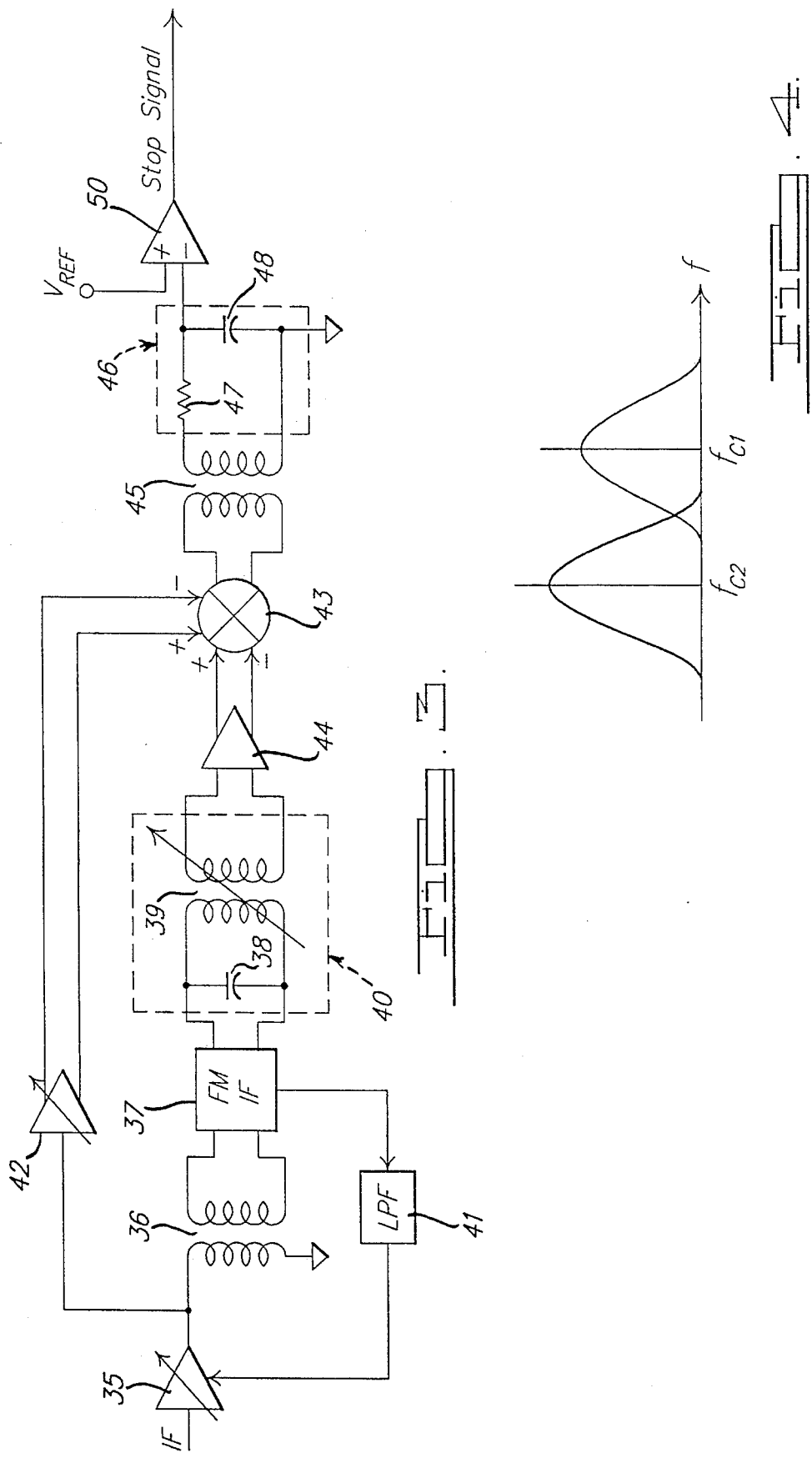

HIGH-QUALITY RECEPTION INDICATING CIRCUIT FOR SCANNING AM RECIEVERS

BACKGROUND OF THE INVENTION

The present invention relates in general to identifying signal quality of a received AM radio transmission, and more specifically, to detecting the presence of an AM signal of sufficient reception quality to stop a scan tuning operation.

Receivers for commercial radio broadcasts are typically equipped with scan and/or seek functions. In response to the initiation of a scan or seek operation, a receiver examines consecutive allocated frequencies for a broadcast having sufficient reception quality. When such signal is detected, the scan or seek function is paused or terminated to allow audible reproduction of the broadcast.

Several different methods have been employed to generate a stop signal for terminating the frequency sweep operation in an automatically scanning tuner. Most methods rely on a measure of the received signal strength, a frequency window determined by a quadrature detector or an IF counter circuit, or a combination of these. Some methods also employ detection of the noise level associated with an allocated channel being examined. AM radio receivers especially rely on a measure of received signal strength in generating a stop signal.

Scan tuning operations in an AM receiver tend to be slow. As with substantially all radio receivers, an AM receiver is provided with automatic gain control (AGC). Automatic gain control is a well-known technique for maintaining a substantially constant level of an amplified output signal even though the input signal level is varying. In broadcast communication receivers, AGC is employed to provide a consistent audio output level despite fluctuations in signal strength of a tuned-in broadcast signal or fluctuations occurring while retuning to other broadcast signals.

In the case of an AM receiver, the AGC loop must have a long enough time constant to avoid filtering out the modulated audio information on the AM carrier; otherwise, the AGC loop would remove the AM modulation and destroy the audio information. Thus, in a scanning AM receiver, the decision time to determine whether a quality broadcast is being received based on a measure of signal strength must be longer than the AGC loop response time. This causes undesirable delays in finding an acceptable broadcast signal during a scan tuning operation.

Another problem in prior art scanning AM receivers relates to stopping on a broadcast signal having adjacent channel interference. The presence of a strong broadcast signal on an adjacent channel adds to the signal strength measure at the current weak channel of interest, thereby inflating the true signal strength at that frequency. Thus, a scan-tune function may stop at a broadcast signal having unacceptable reception quality.

SUMMARY OF THE INVENTION

The present invention has the advantage of determining reception quality in an AM broadcast signal without relying on a measure of signal strength that is delayed by the AGC time constant. A further advantage is that the reception quality measure of the present invention detects adjacent channel interference thereby avoiding the stopping of a scan on a signal having adjacent channel interference.

These and other advantages are obtained by examining the characteristics of an incoming broadcast signal without relying on the AGC loop time. The currently tuned signal is examined at the intermediate frequency. The primary audio and carrier components of the signal are removed. The remaining signal characterizes residual noise, including adjacent channel interference, that may be present in the tuned signal. Furthermore, the residual noise will always be high if no substantial signal is present on the channel. The amount of residual noise defines the received signal quality.

More specifically, the invention includes a method for determining the reception quality of an amplitude (AM) radio signal received by a receiver. The AM radio signal is mixed to an intermediate frequency (IF), including a carrier. Audio information is substantially removed from the IF signal to create a modified IF signal. Transitions (zero crossover points) of the carrier are recovered from the modified IF signal. A substantially pure carrier sine-wave signal is regenerated from the recovered transitions. The modified IF signal and the substantially pure carrier sine-wave signal are added 180° out-of-phase to reveal the hidden noise signal having the carrier substantially eliminated therefrom. The reception quality is measured in response to the noise signal level (e.g., compared to a predetermined threshold). In a scanning receiver, the noise signal is used to provide a stop signal when a high quality broadcast is indicated.

BRIEF DESCRIPTION OF THE DRAWINGS

FIG. 3 is a block diagram showing an alternate embodiment of the present invention.

FIG. 4 illustrates the occurrence of adjacent channel interference.

DETAILED DESCRIPTION OF PREFERRED EMBODIMENTS

Figure 1:
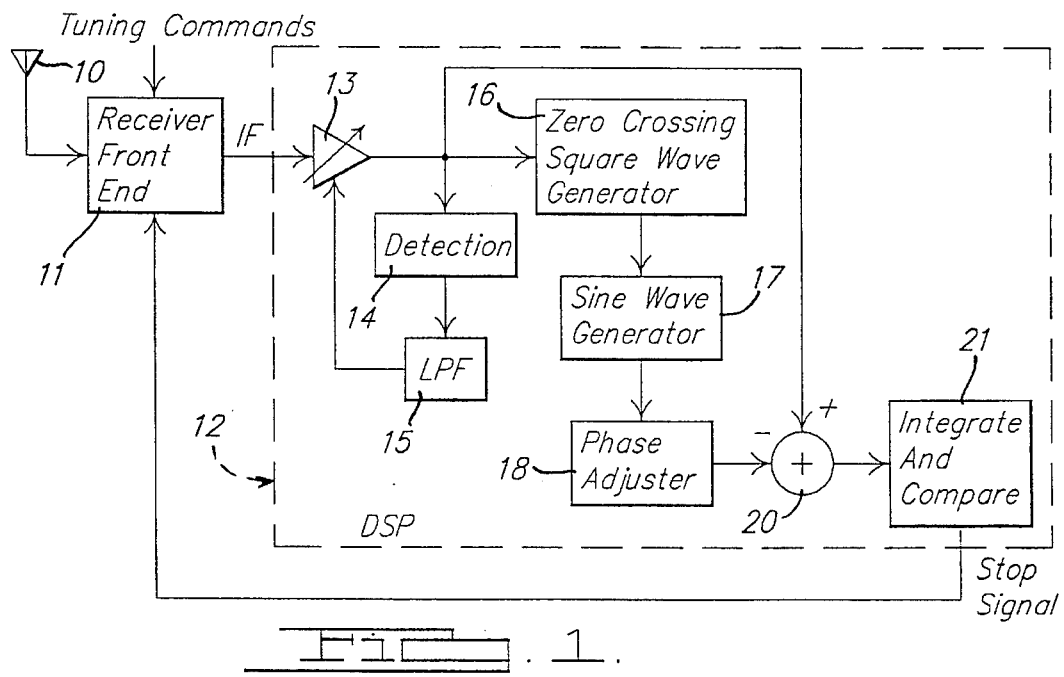
FIG. 1 is a block diagram illustrating a preferred embodiment of the present invention.

Referring to FIG. 1, an AM radio receiver includes an antenna 10 coupled to a receiver front end 11. An RF broadcast signal is captured by antenna 10 and converted by front end 11 to an intermediate frequency (IF) signal by mixing, as known in prior art superheterodyne radio receivers. The mixing frequency needed to convert a selected broadcast channel to the predetermined intermediate frequency is determined in response to tuning commands provided to front end 11 from a user. The tuning commands include seek or scan functions, such as scan up or scan down, wherein broadcast channels are sequentially examined for an existing program of sufficient signal quality for reproduction. Front end 11 is responsive to a stop signal during a seek or scan when an acceptable station has been detected. In operation, front end 11 may tune to a selected channel. If no stop signal is generated within a predetermined amount of time, front end may then proceed to the next channel for examination. Alternatively, a "go" signal can be generated when an unacceptable channel is detected in order to continue the scan of front end 11. Furthermore, a combination of stop and go signals may be employed.

The IF signal from front end 11 is detected and processed in order to reproduce the broadcast audio information by conventional means, not shown. In addition, the IF signal is provided to a variable gain block 13 in a signal quality detector 12. Signal quality detector 12 may preferably be implemented using digital signal processing (DSP) techniques which would necessitate that the IF signal first be digitized. The output of variable gain block 13 provides a modified IF signal which is coupled to the input of an amplitude detection block 14. Any amplitude modulation on the carrier signal in the modified IF signal is detected and coupled to a low pass filter (LPF) 15 having an upper cutoff frequency corresponding to the desired received audio (typically about 5 kHz). LPF 15 passes the audio information in the AM signal while blocking high frequency content including any residual noise present on the carrier signal. The output of LPF 15 is coupled to a gain control input of variable gain block 13 for reducing the amplitude modulation of the modified IF signal. Thus, variable gain block 13, detection block 14 and LPF 15 act as an AGC loop. However, this AGC loop has a fast response time as it is desired to remove the AM modulation corresponding to the audio information in the broadcast signal. Therefore, an increase in the output signal from LPF 15 results in a decreased gain in variable gain block 13 and vice versa. Variable gain block 13 may preferably be implemented in DSP as a multiplier for multiplying the value of the IF signal by the inverse of the LPF output signal to generate the modified IF signal.

The modified IF signal containing crossover information is coupled to the input of a zero-crossing square-wave generator 16 for establishing the zero-crossings in the modified IF signal. The zero-crossing information from generator 16 is coupled to a sine-wave generator 17 for producing a pure sine-wave carrier signal which corresponds to the carrier signal as originally broadcast by the AM broadcast transmitter. The pure sine-wave carrier signal is coupled to a phase adjuster 18. The adjusted-phase pure sine-wave carrier signal is coupled to one input of a summer 20. The modified IF signal is coupled to a second input of summer 20. Phase adjuster 18 compensates for any phase delay differences in generators 16 and 17 so that the pure sine-wave carrier signal is combined 180° out of phase with the modified IF signal in summer 20.

In a DSP implementation, blocks 16, 17, and 18 may preferably be combined into a single function for producing the desired regenerated carrier signal. However, FIG. 1 illustrates the essential functions for accomplishing a removal of analog information and carrier signal components from a received AM signal in order to detect signal quality for any hardware or other type of implementation.

The output of summer 20 corresponds to residual noise in the received AM broadcast signal. In the event that there is in fact no broadcast signal present at the frequency being examined, the residual noise content will always be high. When a broadcast signal is present, residual noise may be significant where the signal strength of the broadcast signal is low compared to noise sources or if powerful noise sources are present at the frequency, such as adjacent channel interference.

The output of summer 20 is connected to the input of integrate and compare block 21. After any necessary rectification, the residual noise is integrated to obtain an average value (e.g., voltage) of the residual noise content. The average value is compared to a predetermined threshold (such as a predetermined voltage) for distinguishing between a broadcast signal that may be satisfactorily reproduced and one that contains an unacceptable amount of noise. When the average residual noise level is below the predetermined threshold, a stop signal is generated and coupled to front end 11 for terminating or pausing the scan tuning operation.

Figure 2A:
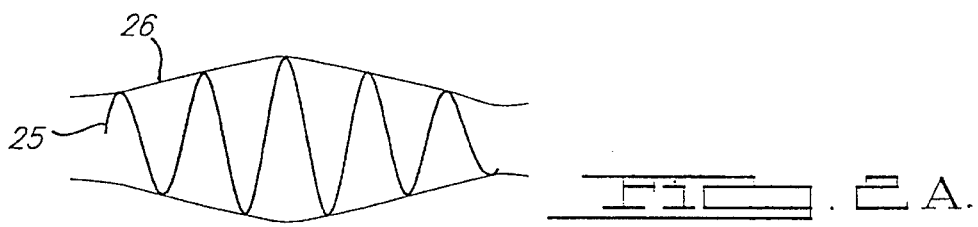
FIGS. 2A–2E illustrate waveforms associated with FIG. 1.
Figure 2B:
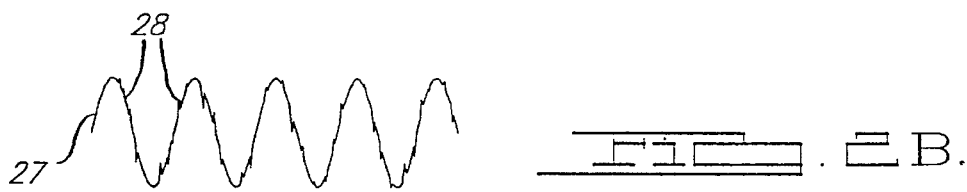

The operation of the present invention will be further described with reference to FIGS. 2A–2E. FIG. 2A shows IF signal 25 from the receiver front end. IF signal 25 has a frequency equal to the intermediate frequency used by a particular receiver (e.g., 10.7 MHz or 450kHz) and is modulated by an audio information signal 26. FIG. 2B shows the modified IF signal having modulation by the audio information substantially removed (i.e. having a substantially constant peak-to-peak amplitude) but including residual carrier noise above the upper cutoff frequency of LPF 15 in FIG. 1. Thus, modified IF signal 27 includes the plurality of noise pulses 28.

Figure 2C:
Figure 2D:
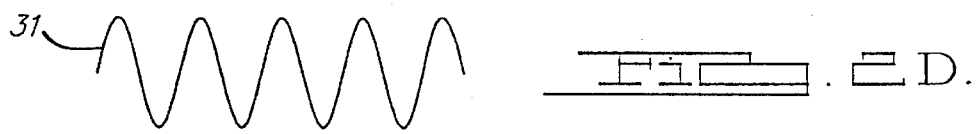
Figure 2E:
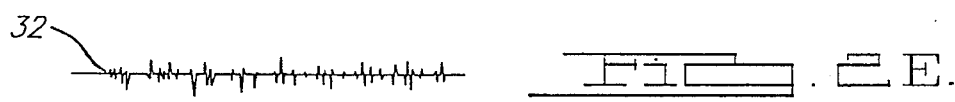

FIG. 2C shows a square-wave 30 derived from modified IF signal 27 having transitions at the zero crossings of modified IF signal 27. A pure sine-wave carrier signal 31 is shown in FIG. 2D as derived from square-wave signal 30. Subtraction of pure sine-wave carrier signal 31 from modified IF signal 27 produces a noise signal 32 shown in FIG. 2E. Alternatively, the pure sine-wave carrier signal may be generated with a 180° phase shift with the respect to the modified IF signal and the two signals would be added to produce the noise signal.

The alternative embodiment of FIG. 3 includes a variable gain amplifier 35 having the IF signal applied to its input. The modified IF signal output from amplifier 35 is coupled through an impedance matching transformer 36 to the input of an FM IF circuit 37 which may be comprised of an 4222X6 integrated circuit available from Siemens, for example. The FM IF circuit 37 includes a limiter amplifier which is utilized to provide a zero-crossing square-wave generator. FM IF circuit 37 also includes a signal strength peak detector which is utilized to provide a demodulated AM output. The square-wave signal from the limiter amplifier is provided to a quadrature tank circuit 40 comprised of a capacitor 38 connected in parallel with a variable impedance transformer 39. Resonant tank circuit 40 simultaneously provides sine-wave conversion and phase adjustment. Resonant tank circuit 40 has a nominal resident frequency equal to the IF frequency (e.g., 10.7 MHz) and a bandwidth of about 200 kHz. The inductance of transformer 39 is adjusted to tune the resonant frequency of resonant tank circuit 40 to obtain an appropriate amount of phase shift.

Low pass filter (LPF) 41 receives the peak signal strength signal from FM IF 37, filters out residual noise content over about 5 kHz in frequency, and provides a gain signal to variable gain amplifier 35 at a gain control input for implementing an AGC loop. The modified IF signal from amplifier 35 is coupled to the input of a buffer amplifier 42. Differential outputs provided by amplifier 42 are connected to respective positive and negative inputs of a mixer 43. The phase-shifted reconstructed pure sine-wave carrier signal from resonant circuit 40 is coupled to respective positive and negative inputs of mixer 43 through a differential amplifier 44.

The respective inputs to mixer 43 are preferably selected to be 180 degrees out of phase. Thus, the output of mixer 43 has the carrier frequency signals removed since they are mixed to zero frequency (any signals resulting from the mixing operation at twice the carrier frequency are suppressed because they are outside the bandwidth of the components). All that remains in the output of mixer 43 is residual noise which is coupled through a coupling transformer 45 to an integrating circuit 46 including a resistor 47 and capacitor 48. The output of integrating circuit 46 is connected to the inverting input of a comparator 50. The noninverting input of comparator 50 is coupled to a predetermined threshold voltage $V_{REF}$. The output of comparator 50 provides the stop signal.

The operation of FIG. 3 is substantially identical to the operation as discussed above with regard to FIGS. 1 and 2. Variable gain amplifier 35 preferably has a high dynamic range on the order of about 60 dB, whereby the modified IF signal has about 90 percent of the AM modulation eliminated. The response of the AGC loop comprised of FM IF 37, LPF 41, and amplifier 35 is at a rate of about 1 MHz, far faster than the rate at which prior art stop signal detectors can operate.

Calibration of variable transformer 39 and variable gain buffer amplifier 42 need be preformed only once upon manufacture and can remain fixed thereafter. Thus, a test signal is applied to the signal quality detector without substantial residual noise while transformer 39 and amplifier 42 are iteratively adjusted to minimize the output of mixer 43. Depending on stability of components used, the gain of buffer amplifier 42 may even be fixed at the design stage.

The stop signal from comparator 50 quickly identifies whether the reception quality of any broadcast signal at the frequency being examined is acceptable for reproduction. The stop signal can be provided to a microprocessor that controls radio operation to either continue, pause, or stop the scan tuning operation, and to unmute an audio output that may have been muted during the frequency scanning operation, as is known in the art. Other processing may also be performed before deciding to stop at a particular channel, such as an IF count to verify that the receiver is on frequency.

By selecting the upper cutoff frequency of LPF 15 at approximately 5 kHz, adjacent channel signals are blocked from the AGC loop and are therefore included in the modified IF signal. Thus, they contribute to residual noise. As shown in FIG. 4, a first broadcast signal has a carrier frequency $f_{C1}$. A second, stronger broadcast signal is present at a second carrier frequency $f_{C2}$ at an adjacent channel. The stronger signal has a frequency component overlapping with the first broadcast signal, contributing to adjacent channel interference. Since this interference contributes to the residual noise detected by the present invention, a scanning operation does not stop at a channel possessing adjacent channel interference.

What is claimed is:

1. A method for determining the reception quality of an amplitude modulated (AM) radio signal received by a receiver, comprising the steps of:

mixing said AM radio signal to an intermediate frequency (IF) signal including a carrier;

substantially removing audio information modulated within said IF signal to generate a modified IF signal;

recovering transitions of said carrier from said modified IF signal;

regenerating a substantially pure carrier sine-wave signal from said recovered transitions;

subtracting said modified IF signal and said substantially pure carrier sine-wave signal to generate a noise signal having said carrier substantially eliminated therefrom; and measuring said reception quality in response to said noise signal.

2. The method of claim 1 wherein said measuring step is comprised of integrating said noise signal and comparing the integrated noise signal with a predetermined threshold.

3. The method of claim 1 further comprising the step of:

phase adjusting said pure carrier sine-wave signal or said modified IF signal whereby elimination of said carrier from said noise signal is substantially maximized.

4. The method of claim 1 wherein said removing step is comprised of:

amplitude detecting said IF signal to generate a detection signal;

lowpass filtering said detection signal to generate a filtered signal; and applying a gain to said IF signal in response to said filtered signal in a manner to reduce said detection signal.

5. The method of claim 4 wherein said lowpass filtering has an upper cutoff frequency of about 5 kHz.

6. An AM radio receiver comprising:

a receiver front end generating an intermediate (IF) signal from a radio frequency (RF) broadcast, said receiver front end selecting an RF broadcast at a selected carrier frequency in response to tuning commands including a scan tune command for initiating a frequency scan;

a variable gain block receiving said IF signal and responsive to a gain signal to generate a modified IF signal;

an amplitude detection block coupled to said IF signal generating a detection signal;

a lowpass filter coupled to said amplitude detection block to lowpass filter said detection signal to generate said gain signal, said gain being coupled to said variable gain block whereby said detection signal is reduced;

a sine-wave generator coupled to said variable gain block to generate a pure sine-wave carrier signal having a predetermined phase relationship with a carrier signal included in said IF signal; and a subtractor forming a difference between said modified IF signal and said pure sine-wave carrier signal.

7. The receiver of claim 6 further comprising a noise level detector determining reception quality of an RF broadcast in response to said difference.

8. The receiver of claim 7 wherein said noise level detector integrates said difference and generates a stop signal when said integrated difference is below a predetermined threshold, said stop signal being coupled to said receiver for terminating a frequency scan.

9. The receiver of claim 6 further comprising a zero-crossing square-wave generator coupled to said variable gain block and said sine-wave generator, said zero-crossing square-wave generator generating a square-wave signal identifying zero-crossings of said modified IF signal, wherein said sine-wave generator converts said square-wave signal into said pure sine-wave carrier signal.

10. The receiver of claim 9 wherein said zero-crossing square-wave generator is comprised of a high-gain limiter amplifier.

11. The receiver of claim 10 wherein said sine-wave generator is comprised of a resonant tank.

12. The receiver of claim 6 wherein said subtractor is comprised of a mixer.

\* \* \* \* \*